US012579950B2

United States Patent

(12) United States Patent
Lin et al.

(10) Patent No.: US 12,579,950 B2
(45) Date of Patent: Mar. 17, 2026

(54) LED DRIVER IC FOR SCANNING BACKLIGHT CONTROL

(71) Applicant: Roku, Inc., San Jose, CA (US)

(72) Inventors: Yi-Fan Lin, Zhubei (TW); Taiquan Lu, San Jose, CA (US); Chung-Yi Chiu, Zhubei (TW); Steve Shaw-Jong Liu, Mountain View, CA (US)

(73) Assignee: Roku, Inc., San Jose, CA (US)

(*) Notice: Subject to any disclaimer, the term of this patent is extended or adjusted under 35 U.S.C. 154(b) by 0 days.

(21) Appl. No.: 18/793,428

(22) Filed: Aug. 2, 2024

(65) Prior Publication Data

US 2026/0038451 A1 Feb. 5, 2026

(51) Int. Cl.
*G09G 3/34* (2006.01)

(52) U.S. Cl.
CPC ....... *G09G 3/3426* (2013.01); *G09G 2310/08* (2013.01); *G09G 2330/023* (2013.01)

(58) Field of Classification Search
None
See application file for complete search history.

(56) References Cited

U.S. PATENT DOCUMENTS

2008/0024076 A1 1/2008 Korcharz et al.
2009/0174331 A1 7/2009 Tanaka
2010/0134406 A1 6/2010 Maruyama et al.
2011/0182064 A1 7/2011 Hasnain et al.
2024/0290289 A1* 8/2024 Kang .................. G09G 3/3426

FOREIGN PATENT DOCUMENTS

CN 213818258 U 7/2021

OTHER PUBLICATIONS

International Search Report and Written Opinion for International Application No. PCT/US2025/038632, mailed on Nov. 19, 2025, 12 pages.

* cited by examiner

*Primary Examiner* — Ifedayo B Iluyomade
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for controlling a backlight apparatus in a media device with driver ICs. In some embodiments, the media device can include a display screen and the backlight apparatus. In some embodiments, the backlight apparatus can include first and second LEDs in a first horizontal zone and third and fourth LEDs in a second horizontal zone. The backlight apparatus can include a first driver IC connected to the first and third LEDs and configured to turn on the first LED during a first time period and the third LED during a second time period. The backlight apparatus can include a second driver IC connected to the second and fourth LEDs and configured to turn on the second LED during the first time period and the fourth LED during the second time period.

18 Claims, 11 Drawing Sheets

900

LED DRIVER IC FOR SCANNING BACKLIGHT CONTROL

FIELD

This disclosure generally relates to media devices that are configured to display video, and more particularly to scanning backlight control for a media device with driver integrated circuits (ICs).

BRIEF SUMMARY

Provided herein are system, apparatus, article of manufacture, method and/or computer program product embodiments, and/or combinations and sub-combinations thereof, for controlling scanning backlight of a backlight apparatus in a media device with driver ICs. In some embodiments, the media device can include a display screen and the backlight apparatus. In some embodiments, the backlight apparatus can include first and second light-emitting diodes (LEDs) in a first horizontal zone and third and fourth LEDs in a second horizontal zone. The backlight apparatus can further include a first driver IC connected to the first and third LEDs and configured to turn on the first LED during a first time period and to turn on the third LED during a second time period different from the first time period. The backlight apparatus can further include a second driver IC connected to the second and fourth LEDs and configured to turn on the second LED during the first time period and to turn on the fourth LED during the second time period.

In some embodiments, the first driver IC can include a timing control unit configured to output a control signal to the first LED during the first time period and to the third LED during the second time period.

In some embodiments, the second driver IC can include a timing control unit to output a control signal to the second LED during the first time period and the fourth LED during the second time period.

In some embodiments, the first time period can be a first quarter of a frame duration and the second time period can be a second quarter of the frame duration.

In some embodiments, the second horizontal zone can be below the first horizontal zone.

In some embodiments, the backlight apparatus can further include fifth and sixth LEDs in the first horizontal zone and seventh and eighth LEDs in the second horizontal zone. A third driver IC can be connected to the fifth and seventh LEDs and configured to turn on the fifth LED during the first time period and the seventh LED during the second time period. A fourth driver IC can be connected to the sixth and eighth LEDs and configured to turn on the sixth LED during the first time period and the eighth LED during the second time period.

In some embodiments, the backlight apparatus can further include fifth and sixth LEDs in a third horizontal zone and seventh and eighth LEDs in a fourth horizontal zone. The first driver IC can be connected to the fifth and seventh LEDs and configured to turn on the fifth LED during a third time period and the seventh LED during a fourth time period. The second driver IC can be connected to the sixth and eighth LEDs and configured to turn on the sixth LED during the third time period and the eighth LED during the fourth time period. In some embodiments, the third time period can be a third quarter of the frame duration and the fourth time period can be a fourth quarter of the frame duration.

In some embodiments, a control signal transmits from the first driver IC to the second driver IC.

In some embodiments, the backlight apparatus can further include a control apparatus. A data input port of the first driver IC can be connected to the control apparatus.

Some embodiments of the present disclosure also relate to a backlight apparatus. In some embodiments, the backlight apparatus can include a first light-emitting diode (LED) in a first horizontal zone and a second LED in a second horizontal zone. The backlight apparatus can further include a driver integrated circuit (IC) connected to the first and second LEDs. The driver IC can include a timing control unit configured to output a control signal to the first LED during a first time period and to the third LED during a second time period different from the first time period.

Some embodiments of the present disclosure also relate to a method of controlling a backlight apparatus in a media device with driver ICs. In some embodiments, the method can include receiving, by a driver integrated circuit (IC), a backlight-dimming control signal for first and second light-emitting diodes (LEDs). The first LED can be in a first horizontal zone and the second LED can be in a second horizontal zone. The method can further include outputting, by the driver IC, the backlight-dimming control signal to the first LED during a first time period. The method can further include outputting, by the driver IC, the backlight-dimming control signal to the second LED during a second time period different from the first time period.

In some embodiments, the method can further include outputting, by the driver IC, the backlight-dimming control signal to a third LED in a third horizontal zone during a third time period. In some embodiments, the method can further include outputting, by the driver IC, the backlight-dimming control signal to a fourth LED in a fourth horizontal zone during a fourth time period.

In some embodiments, the first time period is a first quarter of a frame duration, the second time period is a second quarter of the frame duration, the third time period is the third quarter of the frame duration, and the fourth time period is a fourth quarter of the frame duration.

In some embodiments, the second horizontal zone is below the first horizontal zone, the third horizontal zone is below the second horizontal zone, and the fourth horizontal zone is below the third horizontal zone.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
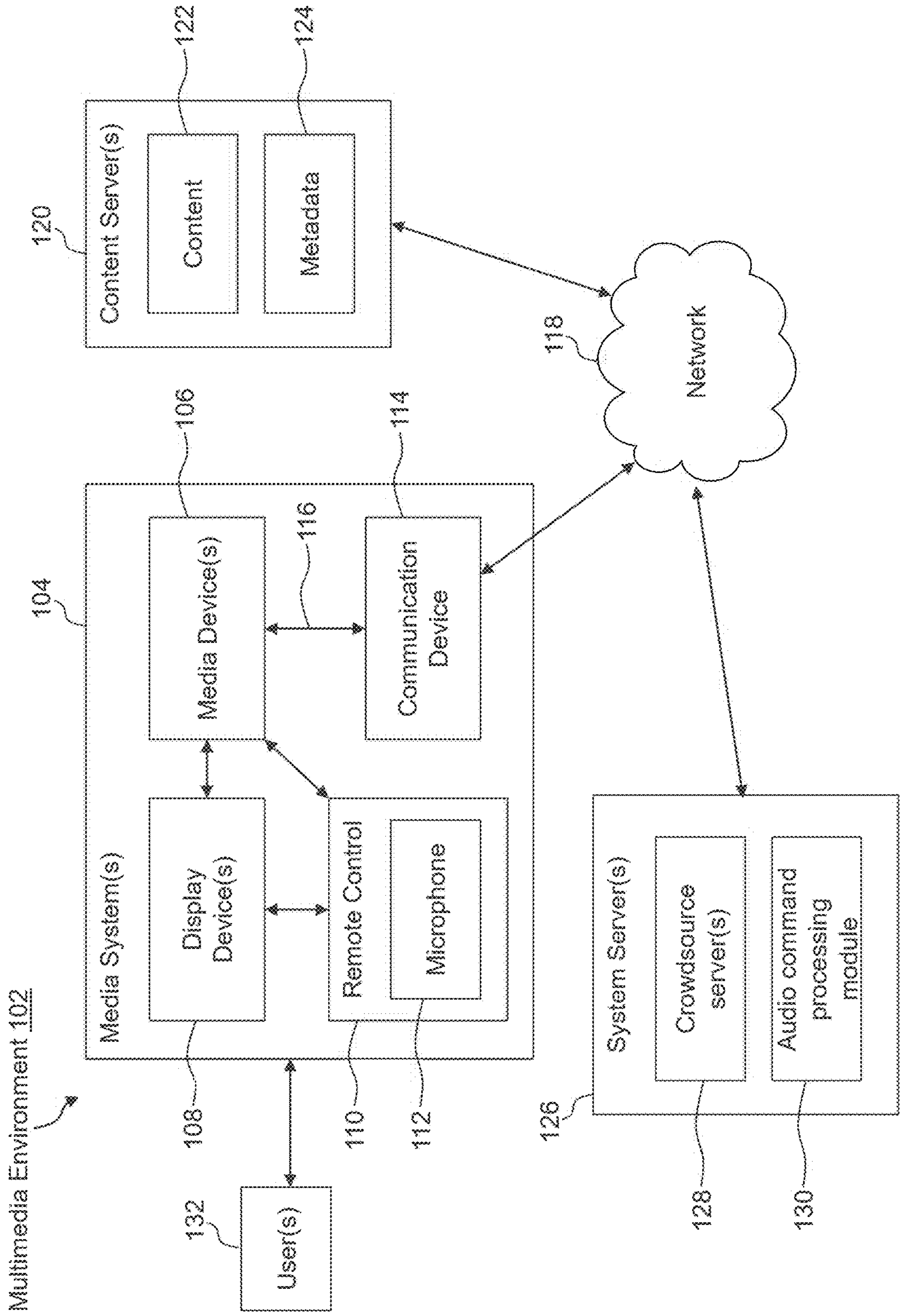
FIG. 1 illustrates a block diagram of a multimedia environment, according to some embodiments.

Provided herein are system, apparatus, device, method and/or computer program product embodiments, and/or combinations and sub-combinations thereof, for controlling a backlight apparatus in a media device with driver ICs.

A media content displayed on a liquid crystal display (LCD) screen of a media device can have motion blur during LCD image transition time. The media content can include a number of frames to be displayed sequentially on the LCD screen. A black frame can be inserted during the LCD image transition time to reduce the motion blur, which can be referred to herein as black frame insertion (BFI). The media device can include a backlight apparatus behind the LCD screen to dynamically control backlight brightness, and thus provide BFI with scanning backlight. The backlight apparatus can include a light board with LEDs and driver ICs mounted thereon, which can reduce the size of the control board and communication cables, can improve driver IC thermal dissipation, and can reduce manufacturing cost. The Driver ICs can control the LEDs with active matrix (AM) driving mode to adjust backlight brightness dynamically and achieve local dimming. The local dimming and dynamic backlight brightness adjustment can improve image contrast, can enhance picture quality, can reduce energy consumption, and can enhance high definition resolution (HDR) performance.

A simple layout configuration of the driver ICs and LEDs does not conventionally provide support for a scanning backlight. The driver ICs typically communicate serially and have one serial peripheral interface (SPI) data input to receive dimming-light control signals for the LEDs, which can be converted into pulse width modulation controlled current signal (PWM current). The PWM current can be uniformly output to each output channel of the driver ICs, for example, output channels 1, 2, 3, and 4, at the same time. Accordingly, upon receiving the SPI data input, the driver ICs can output the PWM current to all output channels simultaneously. At the same time, the driver ICs transmit the dimming-light control signal sequentially via daisy-chain to complete one frame of LED driving. The light board can have a number of horizontal zones of LEDs. The simple layout configuration can have one driver IC connected to LEDs in a column, e.g., in separate horizontal zones. For example, one driver IC can have output channels 1-4. Each of the output channels 1-4 can be connected to one LED in each of horizontal zones 1-4. The driver IC can be located between the second and the third horizontal zones. Each driver IC with corresponding connected LEDs can have the simple layout configuration. As a result, the simple layout configuration can be achieved with one layer of printing circuit board (PCB) and can reduce wire jumpers and reduce trace crossover. However, as the driver ICs communicate serially while each driver IC is connected to LEDs in separate horizontal zones, the simple layout configuration may not provide horizontal scanning backlight.

Due to the inability of the simple layout configuration to achieve horizontal scanning of LED horizontal zones for scanning backlight, the layout of the driver ICs and LEDs can be redesigned to provide scanning backlight in a complex layout configuration. In the complex layout configuration, one driver IC can be connected multiple LEDs in a row, e.g., in one horizontal zone. For example, one driver IC can have output channels 1-4. Each of the output channels 1-4 can be connected to one LED in the same horizontal zone. The driver IC can be located between the second and the third LEDs of the horizontal zone. As a result, the complex layout configuration can provide BFI with horizontal scanning backlight to reduce motion blur. However, as the driver ICs typically communicate serially, the connecting wires between each output channel of the driver ICs and the LEDs can have crossover with the connecting wires between the driver ICs. As a result, the complex layout configuration can increase the complexity of the layout and can increase the number of wire jumpers for the crossover of the connecting wires. This can increase the difficulty of crossover routing and PCB layers of the light board.

Various embodiments in the present disclosure provide methods for providing BFI and scanning backlight in a backlight apparatus of a media device without increasing layout complexity or routing difficulty. In some embodiments, the backlight apparatus of the media device can include a first LED in a first horizontal zone and a second LED in a second horizontal zone. The backlight apparatus can further include a driver IC connected to the first and second LEDs. The driver IC can include a timing control unit configured to output a control signal to the first LED during a first time period and to the third LED during a second time period different from the first time period. With the timing control unit, the driver IC can output the control signal to each output channel at different times, thus turning on different LEDs connected to the driver IC at different times. Having LEDs connected to the driver IC turned on at different times, horizontal scanning backlight with BFI can be achieved without increasing layout complexity or routing difficulty of the backlight apparatus. The backlight apparatus can have one layer of printing circuit board (PCB) to provide scanning backlight function. Additionally, the layout design for the LEDs and driver ICs can be flexible and can be used for various canning frequencies. The simple layout and wiring of the backlight apparatus can further reduce signal loss on the backlight apparatus, reduce the number of layers in the backlight apparatus, and reduce the cost of the backlight apparatus.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
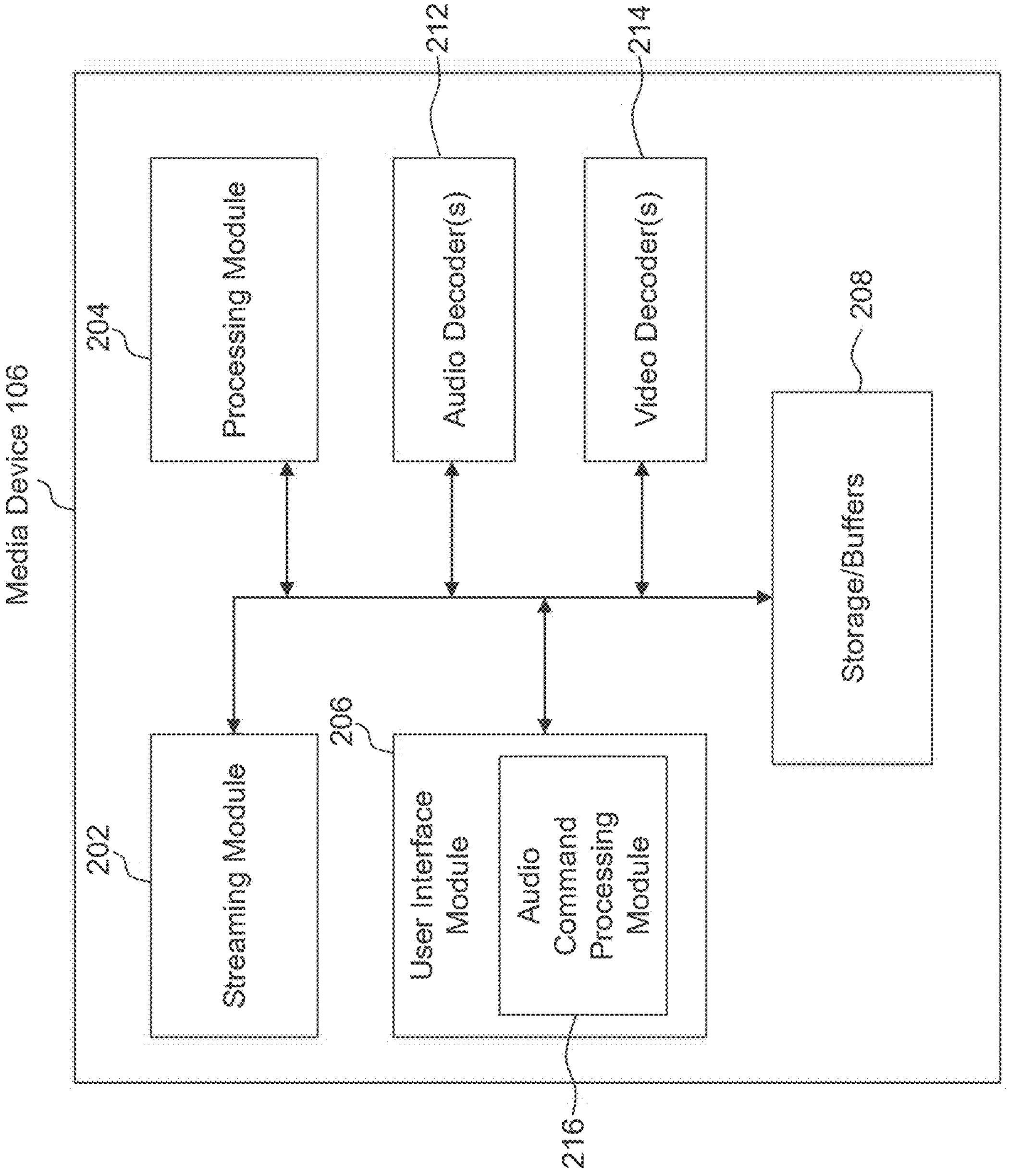
FIG. 2 illustrates a block diagram of a media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Backlight Apparatus

Figure 3:
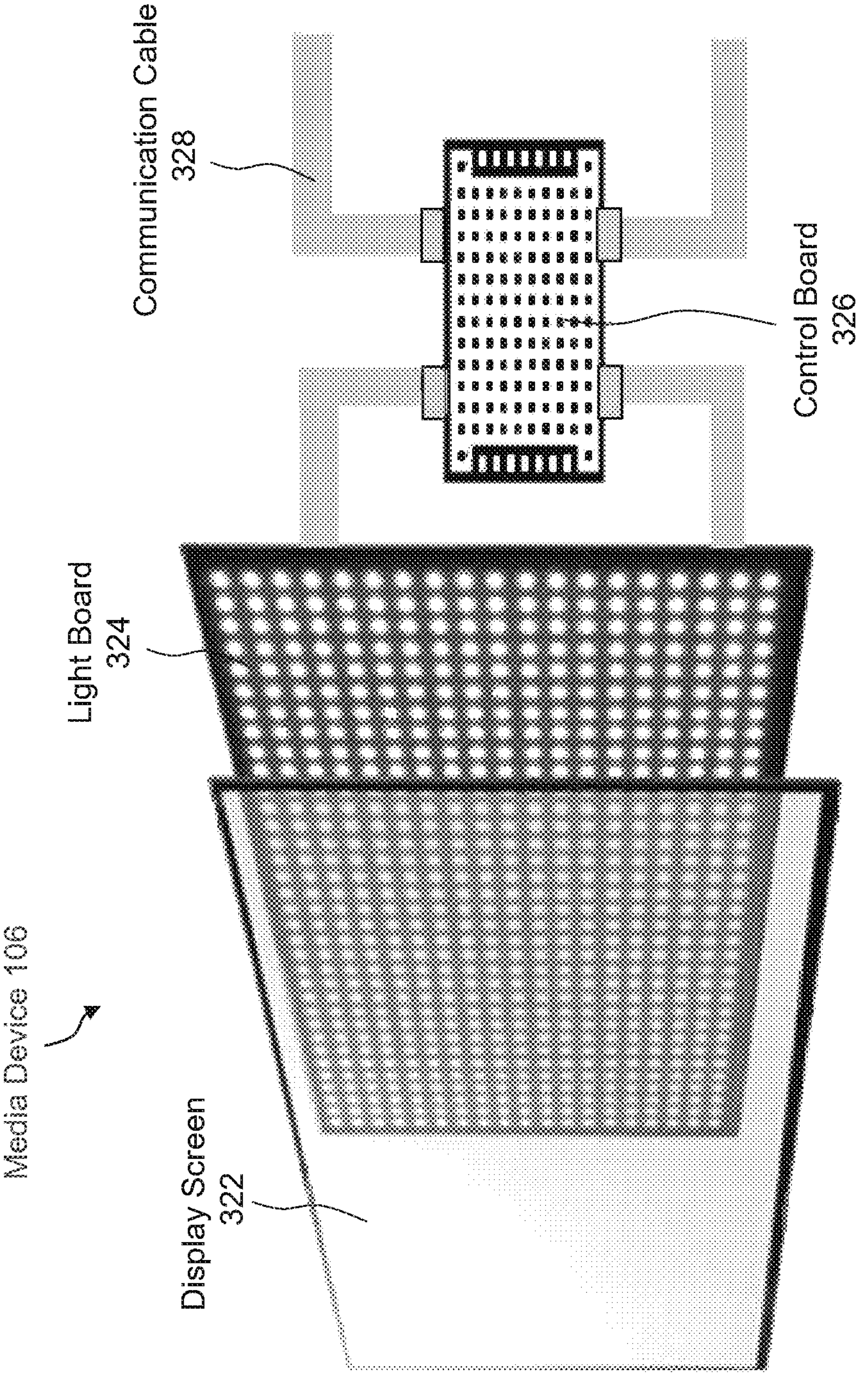
FIG. 3 illustrates a schematic structure of a media device, according to some embodiments.

FIG. 3 illustrates a schematic structure of a media device 106, according to some embodiments. In some embodiments, media device 106 can include display screen 322, light board 324, control board 326, and communication cable 328. In some embodiments, display screen 322, light board 324, control board 326, and communication cable 328 can be a part of, integrated with, and/or operatively coupled to display device 108 shown in FIG. 1.

In some embodiments, display screen 322 can be a liquid crystal display (LCD) screen to display images and videos of a media content. In some embodiments, light board 324 can be a backlight apparatus disposed adjacent to display screen 322 and can provide backlight for display screen 322. In some embodiments, control board 326 can receive and send data and control signals through communication cable 328. For example, control board 326 can receive a dimming-light control signal from either communication device 114, network 118, or other input sources. The dimming-light control signal can be sent to light board 324 to control the corresponding backlight for the images and videos displayed on display screen 322. In some embodiments, the dimming-light control signal can include an activation/deactivation signal, a brightness control signal, and an activation time, including duration of activation, a predetermined brightness, the duration of the predetermined brightness, a brightness modulation, or other suitable control signals.

In some embodiments, communication cable 328 can be a flat flexible cable (FFC). For example, communication cable 328 can be a flat ribbon configured to transport data and signals between different parts of media device 106 and/or display device 108. In some embodiments, communication cable 328 can include connectors configured to communicably couple communication cable 328 to light board 324, control board 326, and other parts of media device 106.

Figure 4:
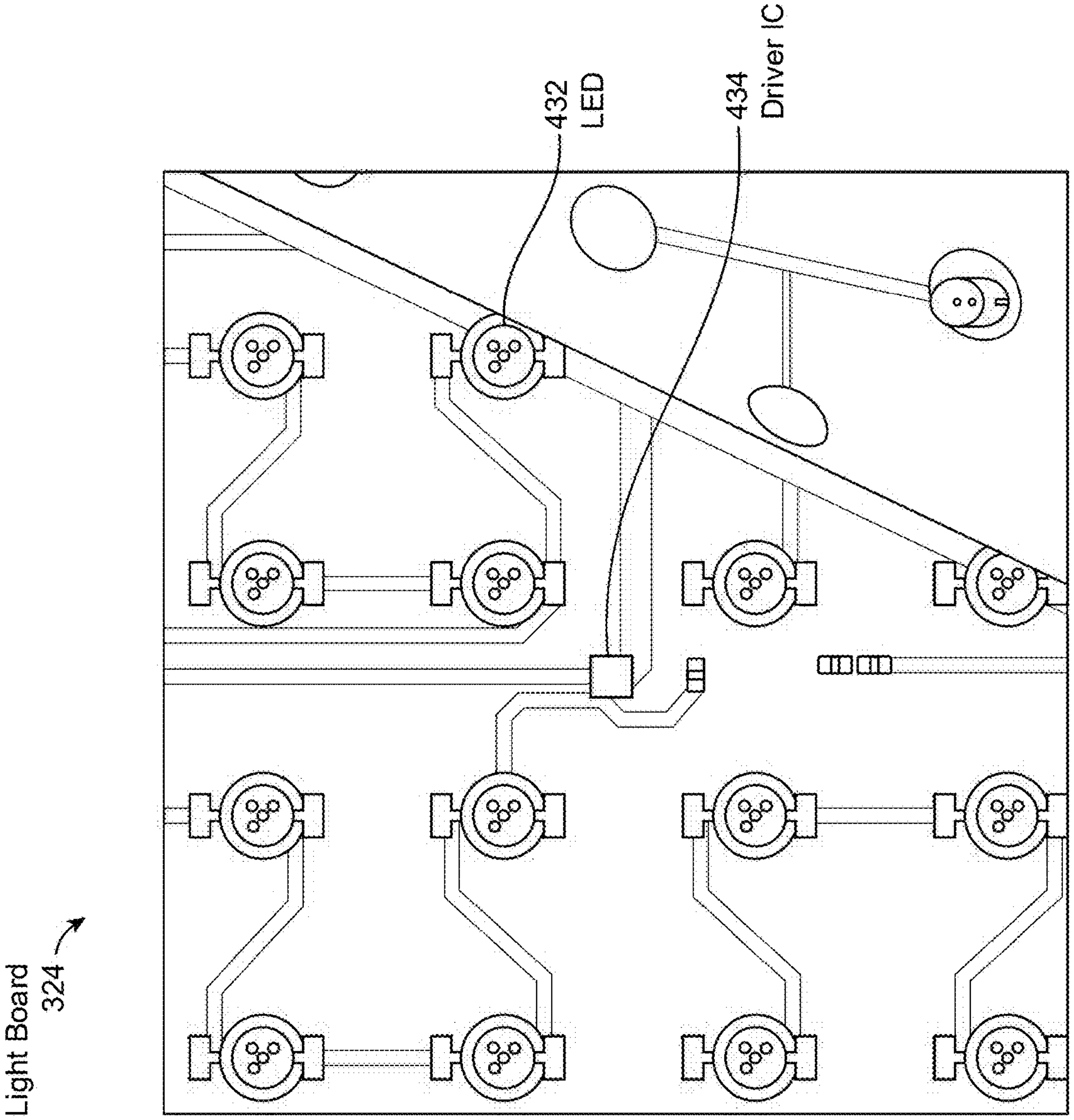
FIG. 4 illustrates a portion of a backlight apparatus of a media device, according to some embodiments.
Figure 5:
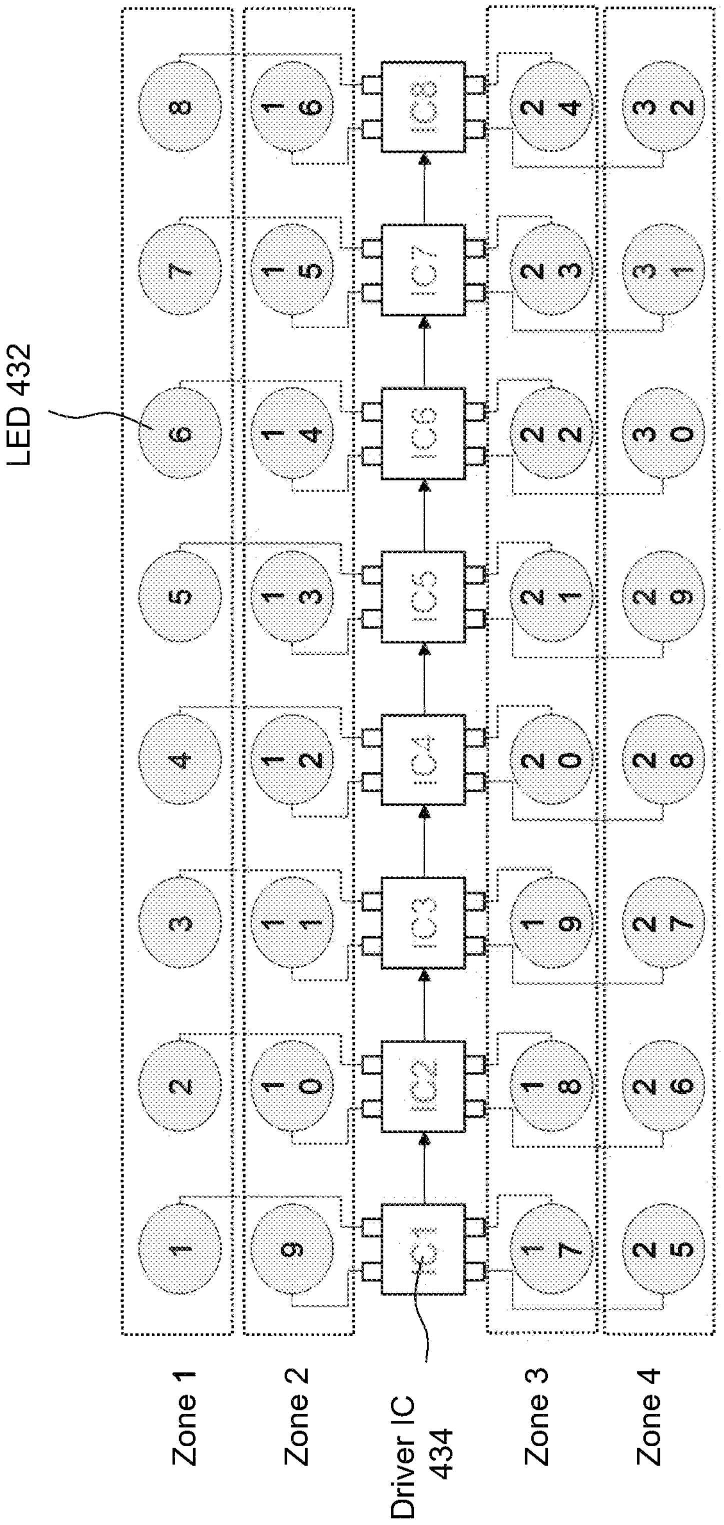
FIG. 5 illustrates a diagram of a backlight apparatus in a media device, according to some embodiments.

In some embodiments, light board 324 can include a number of light-emitting diodes (LEDs) 432 and driver ICs 434, as shown in FIG. 4. FIG. 4 illustrates a portion of a backlight apparatus of media device 106, according to some embodiments. In some embodiments, each LED 432 can be configured to illuminate a predetermined area of display screen 322. In some embodiments, LEDs 432 can receive dimming-light control signals from driver ICs 434 and can be turned on or off by the dimming-light control signals. In some embodiments, LEDs 432 can be arranged in a number of horizontal zones to provide scanning backlight for display screen 322, as shown in FIG. 5. FIG. 5 illustrates a diagram of a backlight apparatus in media device 106, according to some embodiments. As shown in FIG. 5, in some embodiments, light board 324 can include LEDs 432 in horizontal zones 1-4. For example, horizontal zone 1 can include LEDs 432 number 1-8. Horizontal zone 2 can be below horizontal zone 1 and can include LEDs 432 number 9-16. Horizontal zone 3 can be below horizontal zone 2 and can include LEDs 432 number 17-24. Horizontal zone 4 can be below horizontal zone 3 and can include LEDs 432 number 25-32. Each horizontal zone of LEDs 432 can illuminate a predetermined row of display screen 322.

In some embodiments, as shown in FIG. 5, driver ICs 434 IC1-IC8 can operate in a daisy-chain driving mode. The dimming-light control signal can transmit from driver IC 434 IC1 to IC8 sequentially. Driver ICs 434 IC1-IC8 can control LEDs number 1-32 with different channels. For example, a first channel of driver ICs 434 IC1-IC8 can control LEDs 432 in horizontal zone 2 (i.e., LEDs 432 number 9-16). A second channel of driver ICs 434 IC1-IC8 can control LEDs 432 in horizontal zone 1 (i.e., LEDs 432 number 1-8). A third channel of driver ICs 434 IC1-IC8 can control LEDs 432 in horizontal zone 3 (i.e., LEDs 432 number 17-24). A fourth channel of driver ICs 434 IC1-IC8 can control LEDs 432 in horizontal zone 4 (i.e., LEDs 432 number 25-32). In some embodiments, light board 324 can have other numbers of horizontal zones of LEDs 432 and each horizontal zone can have other numbers of LEDs 432. In some embodiments, the number of horizontal zones of LEDs 432 on light board 324 can be determined based on predetermined features of LEDs 432, including, for example, LED type, local dimming requirements, or the like.

In some embodiments, one driver IC 434 can include four channels 1-4 connected to four LEDs 432. For example, as shown in FIG. 5, driver IC 434 IC1 can be connected to LEDs 432 number 1, 9, 17, and 25. Similarly, driver IC 434

IC2 can be connected to LEDs 432 number 2, 10, 18, and 26, driver IC 434 IC3 can be connected to LEDs 432 number 3, 11, 19, and 27, driver IC 434 IC4 can be connected to LEDs 432 number 4, 12, 20, and 28, driver IC 434 IC5 can be connected to LEDs 432 number 5, 13, 21, and 29, driver IC 434 IC6 can be connected to LEDs 432 number 6, 14, 22, and 30, driver IC 434 IC7 can be connected to LEDs 432 number 7, 15, 23, and 31, and driver IC 434 IC8 can be connected to LEDs 432 number 8, 16, 24, and 32. In some embodiments, driver IC 434 can have other numbers of channels and connected to other number of LEDs 432.

Figure 6:
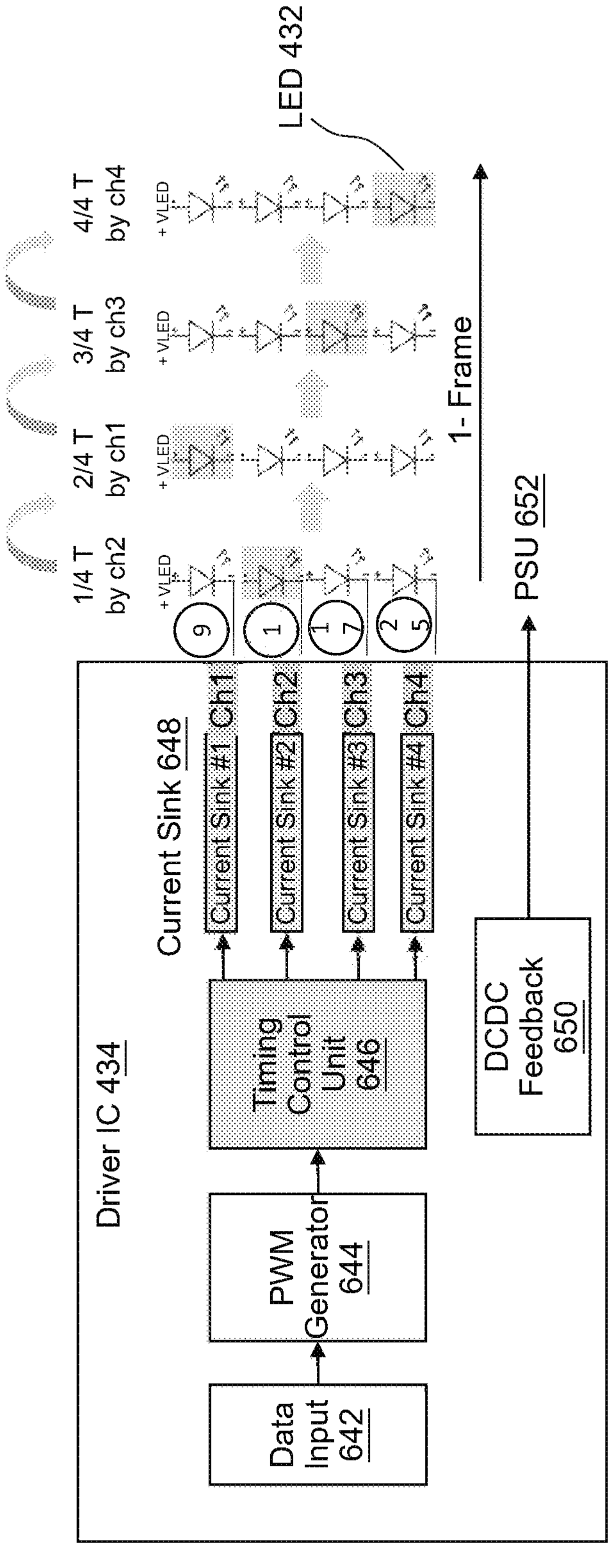
FIG. 6 illustrates a schematic structure of a driver IC in a backlight apparatus of a media device, according to some embodiments.

In some embodiments, driver IC 434 can include data input 642, pulse width modulation (PWM) generator 644, timing control unit 646, current sink 648, and direct current (DC) DC feedback 650, as shown in FIG. 6. FIG. 6 illustrates a schematic structure of driver IC 434 in a backlight apparatus of a media device, according to some embodiments. In some embodiments, FIG. 6 can illustrated driver IC 434 IC1 connected to LEDs 432 number 1, 9, 17, and 25 in FIG. 5. In some embodiments, though LEDs 432 number 1, 9, 17, and 25 for driver IC 434 IC1 are illustrated in FIG. 6, any driver IC 434 and connected LEDs 432 in FIG. 5 can be illustrated by the schematic structure in FIG. 6. In some embodiments, drive IC 434 can communicate in serial and data input 642 can receive a dimming-light control signal for LEDs 432 controlled by driver IC 434. In some embodiments, data input 642 of driver IC 434 IC1 can be electrically connected to control board 326 via communication cable 328 to receive the dimming-light control signal. In some embodiments, PWM generator 644 can convert the received control signal into pulse width modulation controlled current signal (PWM current).

In some embodiments, timing control unit 646 can act as a data buffer for storing data received by data input 642 and converted by PWM generator 644, e.g., the dimming-light control signal for LEDs 432. In some embodiments, timing control unit 646 can control the timing of the PWM current sent to current sinks 648 number 1-4 such that the PWM current can be output from channels 1-4 to LEDs 432 at different time periods of displaying one frame of a media content. For example, timing control unit 646 can control the PWM current to be sent to current sink 648 number 2 during a first quarter of a frame (1/4 T). The PWM current can be output from channel 2 to LED 432 number 1 during the first quarter of the frame. As a result, LED 432 number 1 can be turned on during the first quarter of the frame. Similarly, timing control unit 646 can control the PWM current to be sent to current sink 648 number 1 during a second quarter of the frame (2/4 T). The PWM current can be output from channel 1 to LED 432 number 9 during the second quarter of the frame. As a result, LED 432 number 9 can be turned on during the second quarter of the frame. Timing control unit 646 can control the PWM current to be sent to current sink 648 number 3 during a third quarter of the frame (3/4 T). The PWM current can be output from channel 3 to LED 432 number 17 during the third quarter of the frame. As a result, LED 432 number 17 can be turned on during the third quarter of the frame. Timing control unit 646 can control the PWM current to be sent to current sink 648 number 4 during a fourth quarter of the frame (4/4 T). The PWM current can be output from channel 4 to LED 432 number 25 during the fourth quarter of the frame. As a result, LED 432 number 25 can be turned on during the fourth quarter of the frame.

In some embodiments, DCDC feedback 650 can maintain an output power level at a fixed value independent of a circuit load, an input power level, or environmental variations. In some embodiments, DCDC feedback 650 can be connected to a power supply unit (PSU) 652 to provide a power supply for LEDs 432.

Figure 7:
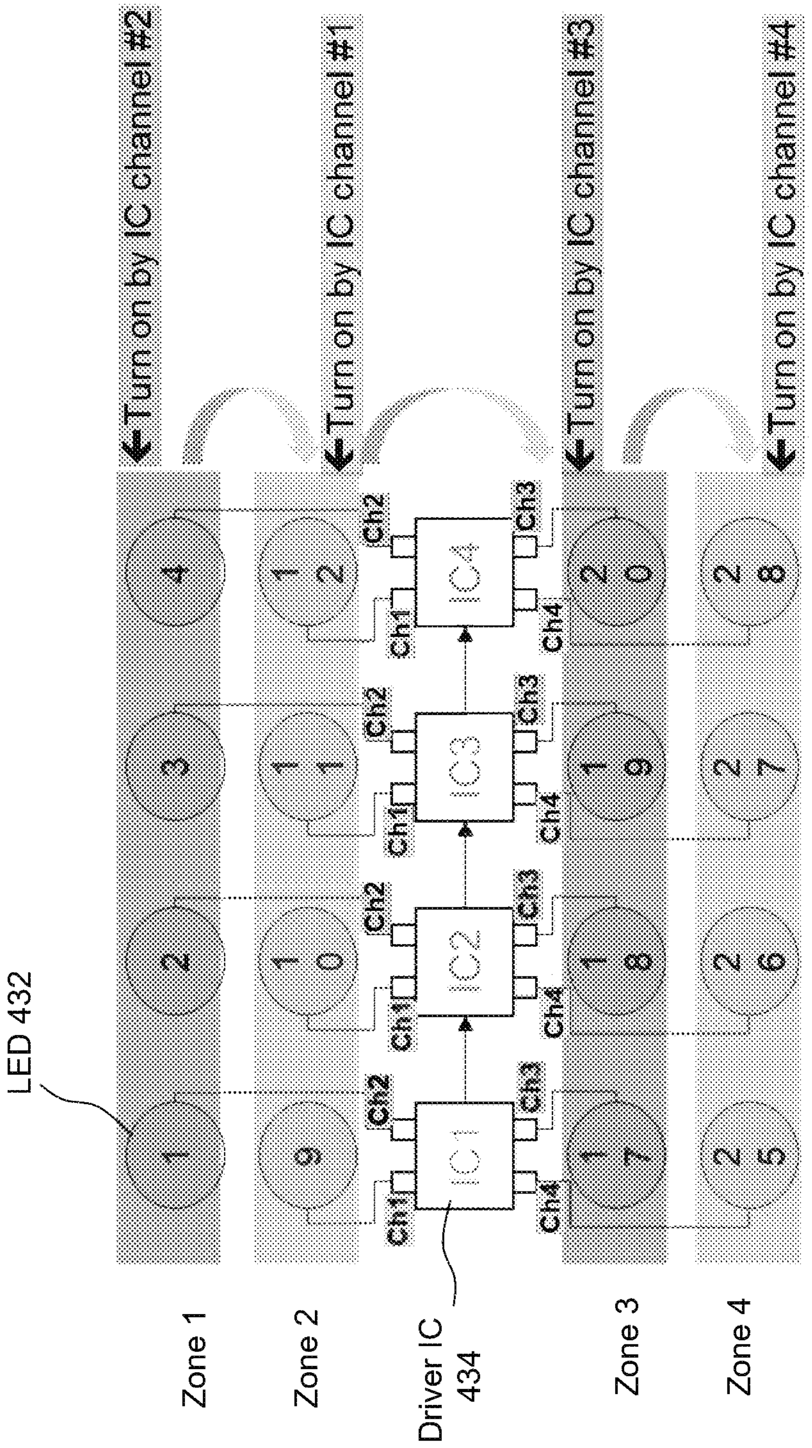
FIG. 7 illustrates a diagram of scanning backlight control with driver ICs in a media device, according to some embodiments.
Figure 8:
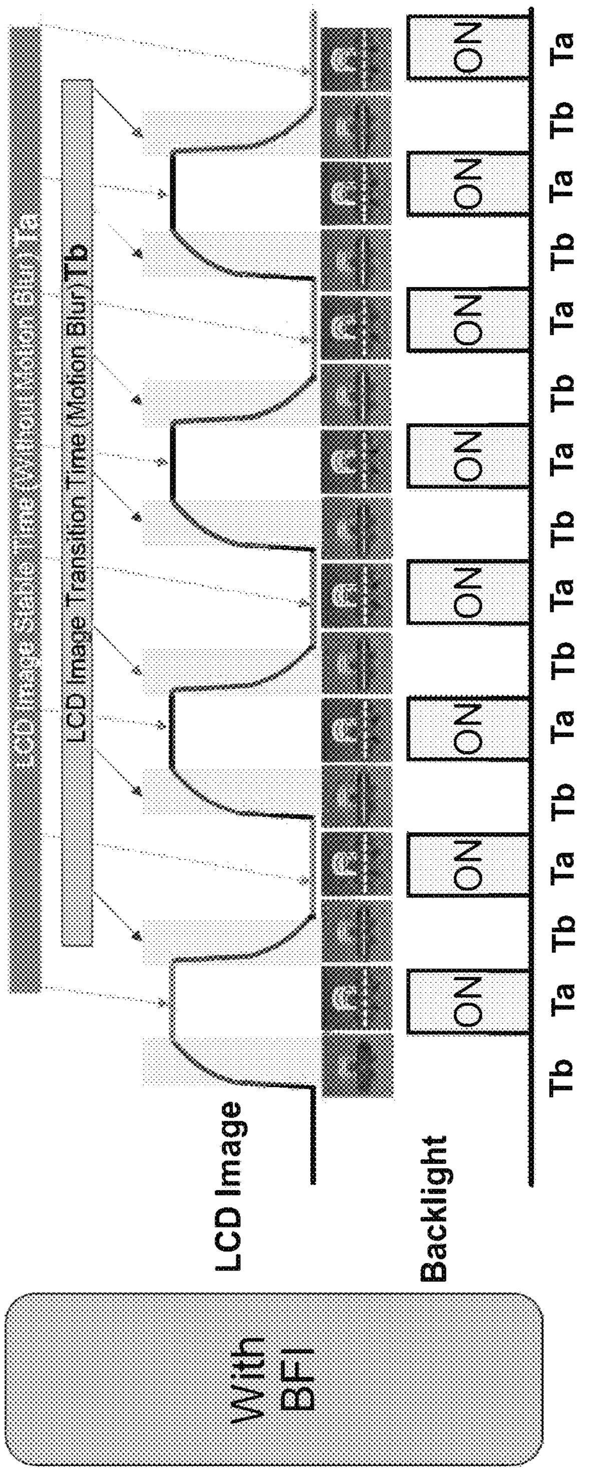
FIG. 8 illustrates displaying a media content using scanning backlight with black frame insertion for a media device, according to some embodiments.

With the layout of LEDs 432 and driver ICs 434 as shown in FIG. 5 and timing control unit 646 for driver IC 434 as shown in FIG. 6, light board 324 can provide BFI with scanning backlight as shown in FIGS. 7 and 8. FIG. 7 illustrates a diagram of scanning backlight control with driver ICs 434 in media device 106, according to some embodiments.

As shown in FIG. 7, during a first quarter (1/4 T) of displaying one frame of a media content on display screen 322, timing control unit 646 in driver ICs 434 IC1-IC4 can control the PWM current to be sent to channel 2 of driver ICs 434 IC1-IC4. The PWM current from channel 2 of driver ICs 434 IC1-IC4 can turn on LEDs 432 number 1-4 during a same time period, e.g., the first quarter (1/4 T) of the frame duration. Similarly, LEDs 432 number 5-8 can be turned on during the first quarter (1/4 T) of the frame duration, which are not shown in FIG. 7 for convenience. As a result, LEDs 432 in horizontal zone 1 can be turned on by channel 2 of driver ICs 434 IC1-IC4 in the same time period while LEDs 432 in horizontal zones 2-4 are turned off. Similarly, during a second quarter (2/4 T) of the frame duration, LEDs 432 in horizontal zone 2 can be turned on by channel 1 of driver ICs 434 IC1-IC4 in the same time period while LEDs 432 in horizontal zones 1, 3, and 4 are turned off. During a third quarter (3/4 T) of the frame duration, LEDs 432 in horizontal zone 3 can be turned on by channel 3 of driver ICs 434 IC1-IC4 in the same time period while LEDs 432 in horizontal zones 1, 2, and 4 are turned off. During a fourth quarter (4/4 T) of the frame duration, LEDs 432 in horizontal zone 4 can be turned on by channel 4 of driver ICs 434 IC1-IC4 in the same time period while LEDs 432 in horizontal zones 1-3 are turned off. In some embodiments, driver ICs 434 can have other numbers of channels and can control each of the other numbers of LEDs 432 to be turned on in different periods of time.

With LEDs 432 in each horizontal zone turned on during different periods of time, light board 324 can provide BFI with scanning light for display screen 322. FIG. 8 illustrates displaying a media content using scanning backlight with black frame insertion for media device 106, according to some embodiments. As shown in FIG. 8, during LCD image stable time Ta, corresponding zones of LEDs 432 on light board 324 behind the LCD image can be turned on and the image on display screen 322 can have no motion blur. During LCD image transition time Tb, corresponding zones of LEDs 432 on light board 324 behind the LCD image can be turned off. Though the LCD image may have motion blur during transition time Tb, viewers in front of the LCD image, such as user 132 of media device 106, may not see the motion blur as zones of LEDs 432 corresponding to the LCD image are turned off. With these black frames inserted during the LCD image transition time Tb, the image contrast on display screen 322 can be improved, the picture quality on display screen 322 can be enhanced, the energy consumption of media device 106 can be reduced, and the HDR performance of media device 106 can be enhanced. Additionally, the design layout and crossover routing for LEDs 432 and driver ICs 434 on light board 324 can be simplified.

Figure 9:
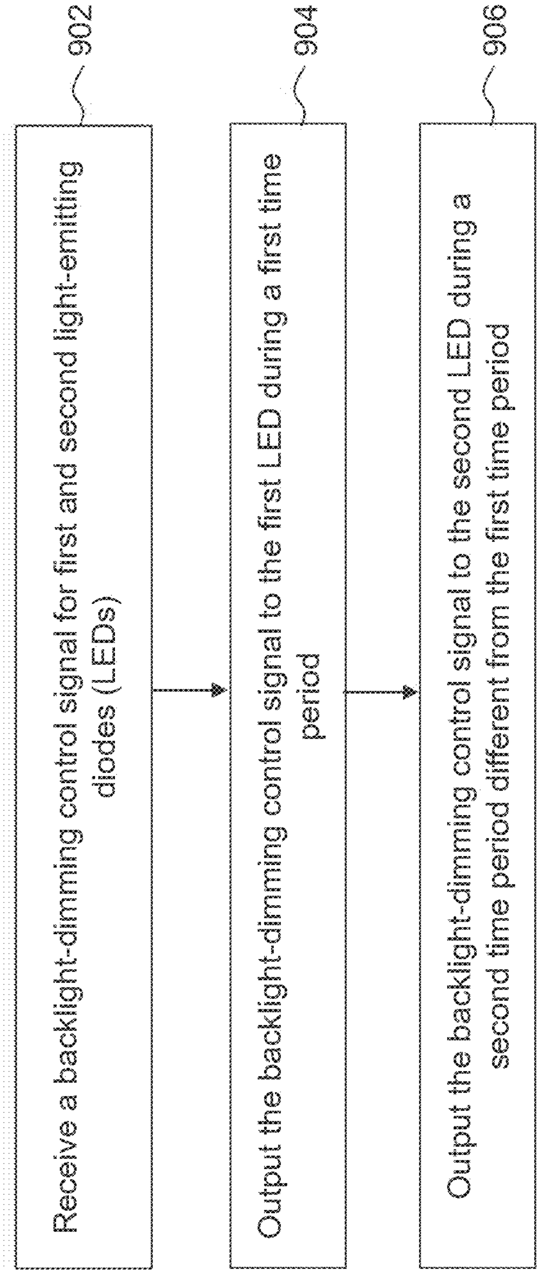
FIG. 9 is a flowchart illustrating a method of controlling a backlight apparatus in a media device, according to some embodiments.

FIG. 9 is a flowchart illustrating a method of controlling a backlight apparatus in a media device, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Method 900 shall be described with reference to FIGS. 3-8. However, method 900 is not limited to that example embodiment.

Referring to FIG. 9, in operation 902, a backlight-dimming control signal is received for first and second LEDs. For example, as shown in FIG. 6, a backlight-dimming control signal can be received by driver IC 434 via data input 642 for LEDs 432 number 1, 9, 17, and 25. Driver IC 434 can control LEDs 432 number 1, 9, 17, and 25 with the backlight-diming control signal. In some embodiments, PWM generator 644 can convert the received backlight-diming control signals into PWM current. In some embodiments, timing control unit 646 can act as a data buffer for storing the received backlight-diming control signal and sending the received backlight-diming control signal to LEDs 432 at different time periods.

In operation 904, the backlight-dimming control signal is output to the first LED during a first time period. For example, as shown in FIG. 6, timing control unit 646 can control the timing of the PWM current sent to current sinks 648 number 1-4 such that the PWM current can be output from channels 1-4 to LEDs 432 at different time periods. In some embodiments, timing control unit 646 can control the PWM current to be sent to current sink 648 number 2 during a first quarter of a frame (1/4 T). The PWM current can be output from channel 2 to LED 432 number 1 during the first quarter of the frame. As a result, LED 432 number 1 can be turned on during the first quarter of the frame.

In operation 906, the backlight-dimming control signal is output to the second LED during a second time period different from the first time period. For example, as shown in FIG. 6, timing control unit 646 can control the PWM current to be sent to current sink 648 number 1 during a second quarter of the frame (2/4 T). The PWM current can be output from channel 1 to LED 432 number 9 during the second quarter of the frame. As a result, LED 432 number 9 can be turned on during the second quarter of the frame.

Additionally, timing control unit 646 can control the PWM current to be sent to current sink 648 number 3 during a third quarter of the frame (3/4 T). The PWM current can be output from channel 3 to LED 432 number 17 during the third quarter of the frame. As a result, LED 432 number 17 can be turned on during the third quarter of the frame. Timing control unit 646 can control the PWM current to be sent to current sink 648 number 4 during a fourth quarter of the frame (4/4 T). The PWM current can be output from channel 4 to LED 432 number 25 during the fourth quarter of the frame. As a result, LED 432 number 25 can be turned on during the fourth quarter of the frame. With timing control unit 646, LEDs 432 number 1, 9, 17, and 25 can be separately controlled by driver IC 434 using the backlight-dimming control signal and can be turned on at different time periods.

Figure 10:
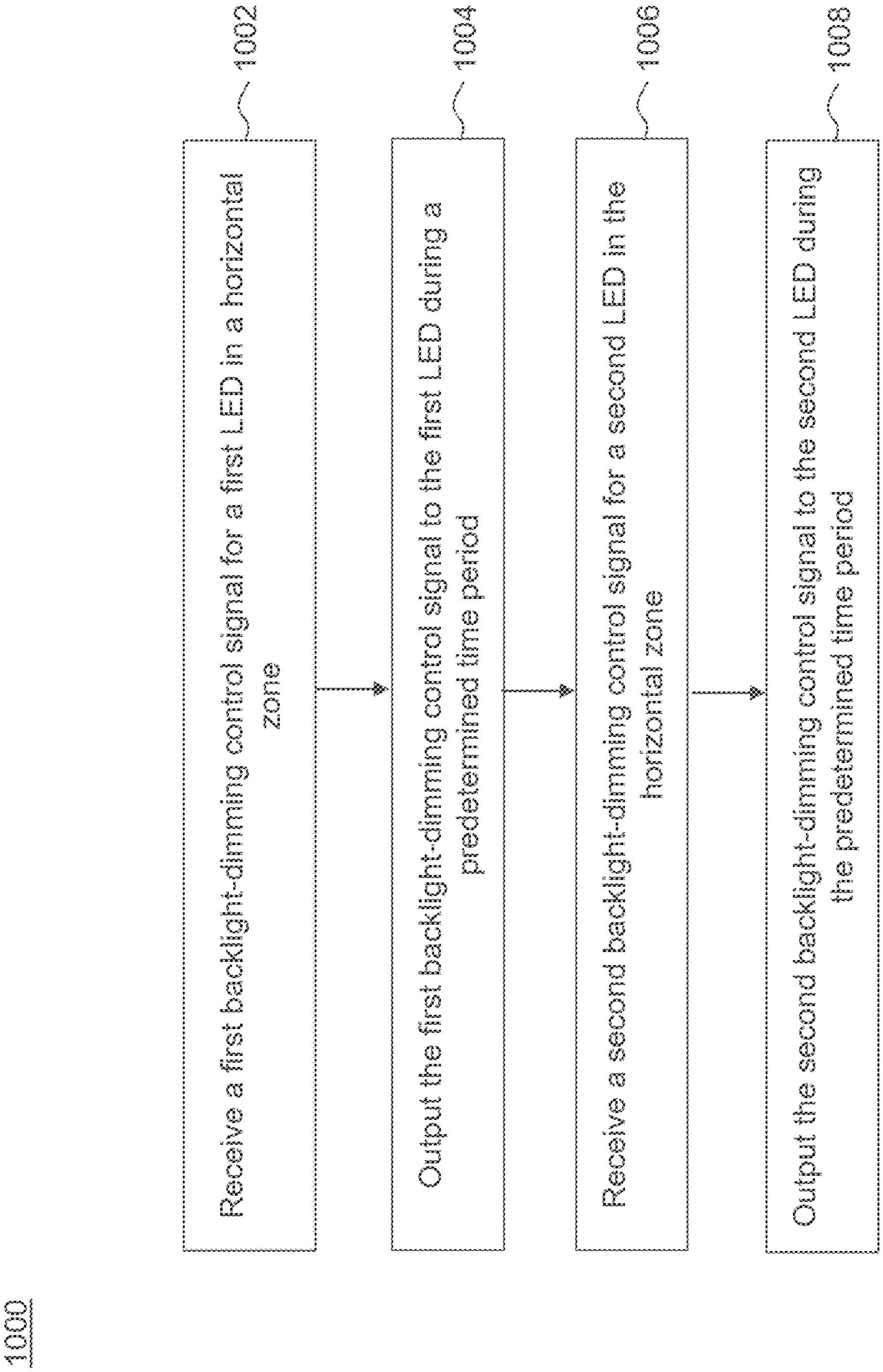
FIG. 10 is a flowchart illustrating another method of controlling a backlight apparatus in a media device, according to some embodiments.

FIG. 10 is a flowchart illustrating another method of controlling a backlight apparatus in a media device, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Method 1000 shall be described with reference to FIGS. 3-8. However, method 1000 is not limited to that example embodiment.

Referring to FIG. 10, in operation 1002, a first backlight-dimming control signal is received for a first LED in a horizontal zone. For example, as shown in FIGS. 5-7, a backlight-dimming control signal can be received by driver IC 434 IC1 via data input 642 for LED 432 number 1 in horizontal zone 1. Driver IC 434 IC1 can control LEDs 432 number 1, 9, 17, and 25 with the backlight-diming control signal. In some embodiments, PWM generator 644 can convert the received backlight-diming control signals into PWM current. In some embodiments, timing control unit 646 can act as a data buffer for storing the received backlight-diming control signal and sending the received backlight-diming control signal to LEDs 432 number 1, 9, 17, and 25 at different time periods.

In operation 1004, the first backlight-dimming control signal is output to the first LED during a predetermined time period. For example, as shown in FIGS. 5-7, the backlight-dimming control signal can be output to LED 432 number 1 during a first quarter of a frame (1/4 T). In some embodiments, timing control unit 646 of driver IC 434 IC1 can control the timing of the PWM current sent to current sinks 648 number 1-4 such that the PWM current can be output from channels 1-4 to LEDs 432 number 1, 9, 17, and 25 at different time periods. In some embodiments, timing control unit 646 can control the PWM current to be sent to current sink 648 number 2 during the first quarter of the frame. The PWM current can be output from channel 2 to LED 432 number 1 during the first quarter of the frame. As a result, LED 432 number 1 can be turned on during the first quarter of the frame.

In operation 1006, a second backlight-dimming control signal is received for a second LED in the horizontal zone. For example, as shown in FIGS. 5-7, a backlight-dimming control signal can be received by driver IC 434 IC2 via data input 642 for LED 432 number 2 in horizontal zone 1. In some embodiments, driver ICs 434 can transmit the dimming-light control signal from number 1 to number 8 sequentially via daisy-chain to complete one frame of LED driving. In some embodiments, the backlight-dimming control signal can be transmitted from driver IC 434 IC1 and received by driver IC 434 IC2 via data input 642. Driver IC 434 IC2 can control LEDs 432 number 2, 10, 18, and 26 with the backlight-diming control signal. In some embodiments, PWM generator 644 can convert the received backlight-diming control signals into PWM current. In some embodiments, timing control unit 646 can act as a data buffer for storing the received backlight-diming control signal and sending the received backlight-diming control signal to LEDs 432 number 2, 10, 18, and 26 at different time periods.

In operation 1008, the second backlight-dimming control signal is output to the second LED during the predetermined time period. For example, as shown in FIGS. 5-7, the backlight-dimming control signal can be output to LED 432 number 2 during the first quarter of the frame (1/4 T). In some embodiments, timing control unit 646 of driver IC 434 IC2 can control the timing of the PWM current sent to current sinks 648 number 1-4 such that the PWM current can be output from channels 1-4 to LEDs 432 number 2, 10, 18, and 26 at different time periods. In some embodiments, timing control unit 646 can control the PWM current to be sent to current sink 648 number 2 during the first quarter of the frame. The PWM current can be output from channel 2 to LED 432 number 2 during the first quarter of the frame. As a result, LED 432 number 2 can be turned on during the first quarter of the frame.

Additionally, the backlight-dimming control signal can be output from channel 2 of driver ICs 434 IC3-IC8 to LEDs 432 number 3-8 during the first quarter of the frame. LEDs 432 number 3-8 can be turned on during the first quarter of the frame. With timing control unit 646, LEDs 432 number 1-8 in horizontal zone 1 can be turned on by driver ICs 434 IC1-IC8 using the backlight-dimming control signal at the same time period, e.g., the first quarter of the frame. Similarly, LEDs 432 number 9-16 in horizontal zone 2 can be turned on by driver ICs 434 IC1-IC8 using the backlight-dimming control signal at another time period, e.g., the second quarter of the frame. LEDs 432 number 17-24 in horizontal zone 3 can be turned on by driver ICs 434 IC1-IC8 using the backlight-dimming control signal at another time period, e.g., the third quarter of the frame. LEDs 432 number 25-32 in horizontal zone 4 can be turned on by driver ICs 434 IC1-IC8 using the backlight-dimming control signal at another time period, e.g., the fourth quarter of the frame. As a result, light board 324 can provide scanning backlight with BFI for the media content displayed on display screen 322 without increasing layout complexity or routing difficulty of LEDs 432 and driver ICs 434.

Example Computer System

Figure 11:
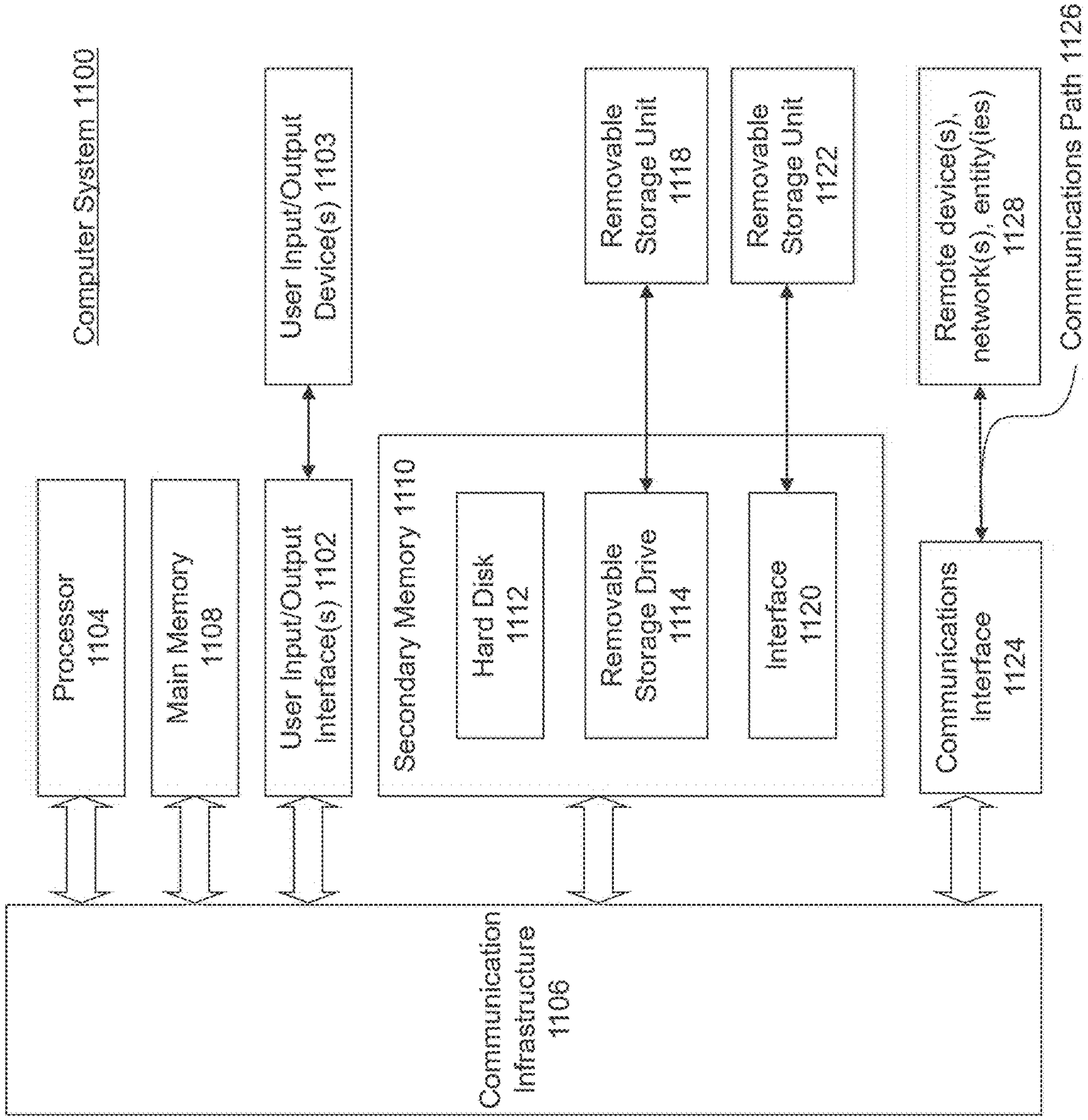
FIG. 11 illustrates an example computer system useful for implementing various embodiments.

Various embodiments may be implemented, for example, using one or more well-known computer systems, such as computer system 1100 shown in FIG. 11. For example, the media device 106 may be implemented using combinations or sub-combinations of computer system 1100. Also or alternatively, one or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media device, comprising: a display screen; and a backlight apparatus, wherein the backlight apparatus comprises: first and second light-emitting diodes (LEDs) in a first horizontal zone; third and fourth LEDs in a second horizontal zone, wherein the first and third LEDs are vertically aligned; a first driver integrated circuit (IC) connected to the first and third LEDs and configured to turn on the first LED during a first time period and to turn on the third LED during a second time period different from the first time period, wherein the first and third LEDs are connected to different output channels of the first driver IC, the first time period is a first quarter of a frame duration, and the second time period is a second quarter of the frame duration; and a second driver IC connected to the second and fourth LEDs and configured to turn on the second LED during the first time period and to turn on the fourth LED during the second time period.

2. The media device of claim 1, wherein the first driver IC comprises a timing control unit configured to output a control signal to the first LED during the first time period and to the third LED during the second time period.

3. The media device of claim 1, wherein the second driver IC comprises a timing control unit to output a control signal to the second LED during the first time period and the fourth LED during the second time period.

4. The media device of claim 1, wherein the second horizontal zone is below the first horizontal zone.

5. The media device of claim 1, further comprising:
fifth and sixth LEDs in the first horizontal zone;
seventh and eighth LEDs in the second horizontal zone;
a third driver IC connected to the fifth and seventh LEDs and configured to turn on the fifth LED during the first time period and to turn on the seventh LED during the second time period; and
a fourth driver IC connected to the sixth and eighth LEDs and configured to turn on the sixth LED during the first time period and to turn on the eighth LED during the second time period.

6. The media device of claim 1, further comprising:
fifth and sixth LEDs in a third horizontal zone; and
seventh and eighth LEDs in a fourth horizontal zone; wherein:
the first driver IC is connected to the fifth and seventh LEDs and configured to turn on the fifth LED during a third time period and to turn on the seventh LED during a fourth time period, and
the second driver IC is connected to the sixth and eighth LEDs and configured to turn on the sixth LED during the third time period and to turn on the eighth LED during the fourth time period.

7. The media device of claim 6, wherein the third time period is a third quarter of the frame duration and the fourth time period is a fourth quarter of the frame duration.

8. The media device of claim 1, wherein a control signal transmits from the first driver IC to the second driver IC.

9. The media device of claim 1, further comprising a control apparatus, wherein a data input port of the first driver IC is connected to the control apparatus.

10. A backlight apparatus, comprising: a first light-emitting diode (LED) in a first horizontal zone; a second LED in a second horizontal zone, wherein the first and second LEDs are vertically aligned; and a driver integrated circuit (IC) connected to the first LED through a first output channel and the second LED through a second output channel different from the first output channel, wherein the driver IC comprises a timing control unit configured to output a control signal to the first LED during a first time period and to the second LED during a second time period different from the first time period, and wherein the first time period is a first quarter of a frame duration and the second time period is a second quarter of the frame duration.

11. The backlight apparatus of claim 10, further comprising a control apparatus, wherein a data input port of the driver IC is connected to the control apparatus, and the control signal transmits from the driver IC to an additional driver IC.

12. The backlight apparatus of claim 10, wherein the second horizontal zone is below the first horizontal zone.

13. The backlight apparatus of claim 10, further comprising:

a third LED in a third horizontal zone; and a fourth LED in a fourth horizontal zone, wherein the driver IC is connected to the third and fourth LEDs and configured to output the control signal to the third LED during a third time period and to the fourth LED during a fourth time period.

14. The backlight apparatus of claim 13, wherein: the third time period is a third quarter of the frame duration; and the fourth time period is a fourth quarter of the frame duration.

15. A method, comprising: receiving, by a driver integrated circuit (IC), a backlight-dimming control signal for first and second light-emitting diodes (LEDs), wherein the first LED is in a first horizontal zone and the second LED is in a second horizontal zone, and wherein the first and second LEDs are vertically aligned; outputting, by the driver IC, the backlight-dimming control signal to the first LED through a first output channel during a first time period; and outputting, by the driver IC, the backlight-dimming control signal to the second LED through a second output channel different from the first output channel during a second time period different from the first time period, wherein the first time period is a first quarter of a frame duration and the second time period is a second quarter of the frame duration.

16. The method of claim 15, wherein the second horizontal zone is below the first horizontal zone.

17. The method of claim 15, further comprising:

outputting, by the driver IC, the backlight-dimming control signal to a third LED in a third horizontal zone during a third time period; and outputting, by the driver IC, the backlight-dimming control signal to a fourth LED in a fourth horizontal zone during a fourth time period.

18. The method of claim 17, wherein the third time period is a third quarter of the frame duration and the fourth time period is a fourth quarter of the frame duration.

* * * * *